(12) United States Patent
Ramasubramonian et al.

(10) Patent No.: US 11,729,428 B2
(45) Date of Patent: Aug. 15, 2023

(54) TEMPORAL SCALABILITY IN GEOMETRY POINT CLOUD COMPRESSION (G-PCC)

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Bappaditya Ray, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/482,012

(22) Filed: Sep. 22, 2021

(65) Prior Publication Data

US 2022/0109884 A1 Apr. 7, 2022

Related U.S. Application Data

(60) Provisional application No. 63/087,809, filed on Oct. 5, 2020.

(51) Int. Cl.
*H04N 19/70* (2014.01)
*H04N 19/31* (2014.01)
*H04N 13/161* (2018.01)

(52) U.S. Cl.
CPC ........... *H04N 19/70* (2014.11); *H04N 13/161* (2018.05); *H04N 19/31* (2014.11)

(58) Field of Classification Search
CPC ....... H04N 19/31; H04N 19/70; H04N 19/161
See application file for complete search history.

(56) References Cited

U.S. PATENT DOCUMENTS

| 2016/0012465 A1* | 1/2016 | Sharp .................. G06Q 20/321 705/14.17 |
| 2021/0360268 A1* | 11/2021 | Drugeon ................ H04N 19/31 |
| 2022/0141488 A1* | 5/2022 | He ...................... H04N 19/172 375/240.12 |

FOREIGN PATENT DOCUMENTS

| WO | 2020146341 A1 | 7/2020 |
| WO | WO-2020146341 A1 * | 7/2020 |
| WO | 2020166643 A1 | 8/2020 |

OTHER PUBLICATIONS

"G-PCC Future Enhancements", 130, MPEG Meeting, Apr. 20, 2020-Apr. 24, 2020, ALPBACH, (Motion Picture Expert Group or ISO/IEC JTC1/SC29/WG11), No. n19328, Jul. 21, 2020, XP030289574, 140 Pages.

(Continued)

*Primary Examiner* — Zhubing Ren
(74) *Attorney, Agent, or Firm* — Shumaker & Sieffert, PA

(57) ABSTRACT

Example devices and techniques are disclosed for incorporating temporal identification information in geometry point cloud compression syntax structures. An example device for decoding point cloud data includes memory configured to store the point cloud data and one or more processors implemented in circuitry and communicatively coupled to the memory. The one or more processors are configured to determine a value of a temporal identifier (ID) of a syntax structure and decode the point cloud data based on the value of the temporal ID. The temporal ID of the syntax structure identifies a temporal layer to which point cloud data associated with the syntax structure belongs.

26 Claims, 5 Drawing Sheets

(56) References Cited

OTHER PUBLICATIONS

Ramasubramonian (Qualcomm), A.K., et al., "[G-PCC] [New proposal] Signalling Temporal ID in G-PCC Slices", 132, MPEG Meeting, Oct. 12, 2020-Oct. 16, 2020, Online, (Motion Picture Expert Group or ISO/IEC JTC1/SC29/WG11), No. m55385 Oct. 14, 2020 (Oct. 14, 2020), XP030291903, 3 Pages, Retrieved from the Internet: URL: https://dms.mpeg.expert/doc_end_user/documents/132_OnLine/wg11/m55385-v2-m55385-v2.zip m55385-v1.pdf [retrieved on Oct. 14, 2020].

Ramasubramonian (Qualcomm), A.K., et al., "[G-PCC] [New proposal] Signalling Temporal ID in G-PCC Slices", 132, MPEG Meeting, Oct. 12, 2020-Oct. 16, 2020, Online, (Motion Picture Expert Group or ISO/IEC JTC1/SC29/WG11), No. m55385 Oct. 7, 2020 (Oct. 7, 2020), XP030292907, pp. 1-2, Retrieved from the Internet: URL: https://dms.mpeg.expert/doc_end_user/documents/132_OnLine/wg11/m55385-v1-m55385-v1.zip m55385-v1.docx [retrieved on Oct. 7, 2020].

International Search Report and Written Opinion—PCT/US2021/051766—ISA/EPO—dated Jan. 14, 2022 13 pp.

ITU-T H.265, "Series H: Audiovisual and Multimedia Systems, Infrastructure of Audiovisual Services—Coding of Moving Video, High efficiency Video Coding", The International Telecommunication Union, Dec. 2016, 664 Pages.

\* cited by examiner

TEMPORAL SCALABILITY IN GEOMETRY POINT CLOUD COMPRESSION (G-PCC)

This application claims the benefit of U.S. Provisional Patent Application 63/087,809, filed Oct. 5, 2020, the entire content of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for enabling and/or improving temporal scalability of geometry point cloud compression (G-PCC) bitstreams. With temporal scalability, the bitstream or the point cloud frames may be partitioned into temporal layers. By receiving different subsets of temporal layers or all temporal layers, a G-PCC decoder may decode the point cloud data at different frame rates. To properly decode a temporal layer, the G-PCC decoder may need to identify which point cloud data belongs to which temporal layer. This disclosure describes techniques to facilitate the G-PCC decoder identifying which point cloud data belongs to which temporal layer.

In one example, this disclosure describes a method of decoding point cloud data including determining a value of a temporal identifier (ID) of a syntax structure; and decoding the point cloud data based on the value of the temporal ID, wherein the temporal ID of the syntax structure identifies a temporal layer to which point cloud data associated with the syntax structure belongs.

In another example, this disclosure describes a method of encoding point cloud data including determining a value of a temporal identifier (ID) of a syntax structure; and encoding the point cloud data to include the temporal ID in the syntax structure, wherein the temporal ID of the syntax structure identifies a temporal layer to which point cloud data associated with the syntax structure belongs.

In another example, this disclosure describes a device for decoding point cloud data including memory configured to store the point cloud data; and one or more processors implemented in circuitry and communicatively coupled to the memory, the one or more processors being configured to: determine a value of a temporal identifier (ID) of a syntax structure; and decode the point cloud data based on the value of the temporal ID, wherein the temporal ID of the syntax structure identifies a temporal layer to which point cloud data associated with the syntax structure belongs.

In another example, this disclosure describes a device for encoding point cloud data including memory configured to store the point cloud data; and one or more processors implemented in circuitry and communicatively coupled to the memory, the one or more processors being configured to: determine a value of a temporal identifier (ID) of a syntax structure; and encode the point cloud data to include the temporal ID in the syntax structure, wherein the temporal ID of the syntax structure identifies a temporal layer to which point cloud data associated with the syntax structure belongs.

The details of one or more examples are set forth in the accompanying drawings and the description below. Other features, objects, and advantages will be apparent from the description, drawings, and claims.

DETAILED DESCRIPTION

Temporal scalability is a desirable property of geometry point cloud compression (G-PCC) bitstreams. With temporal scalability, the bitstream or the point cloud frames may be partitioned into temporal layers. By receiving different subsets of temporal layers or all temporal layers, a G-PCC decoder may decode the point cloud data at different frame rates. Typically (although this is not necessary), if the frames are split into N temporal layers, then frames belonging to temporal layer 1 will represent the point cloud in one frame rate, frames belonging to temporal layers 1 and 2 will represent the point cloud in a higher frame rate, frames belonging to temporal layers 1, 2 and 3 will represent the point cloud in a still higher frame rate, and so on. Therefore, there is a need to identify the various temporal layers of the point cloud frames. Without any such identifying information, it is not possible to distinguish which slices/frames belong to which temporal layer and a G-PCC decoder would not be able to correctly decode the point cloud data at a variety of frame rates.

Figure 1:
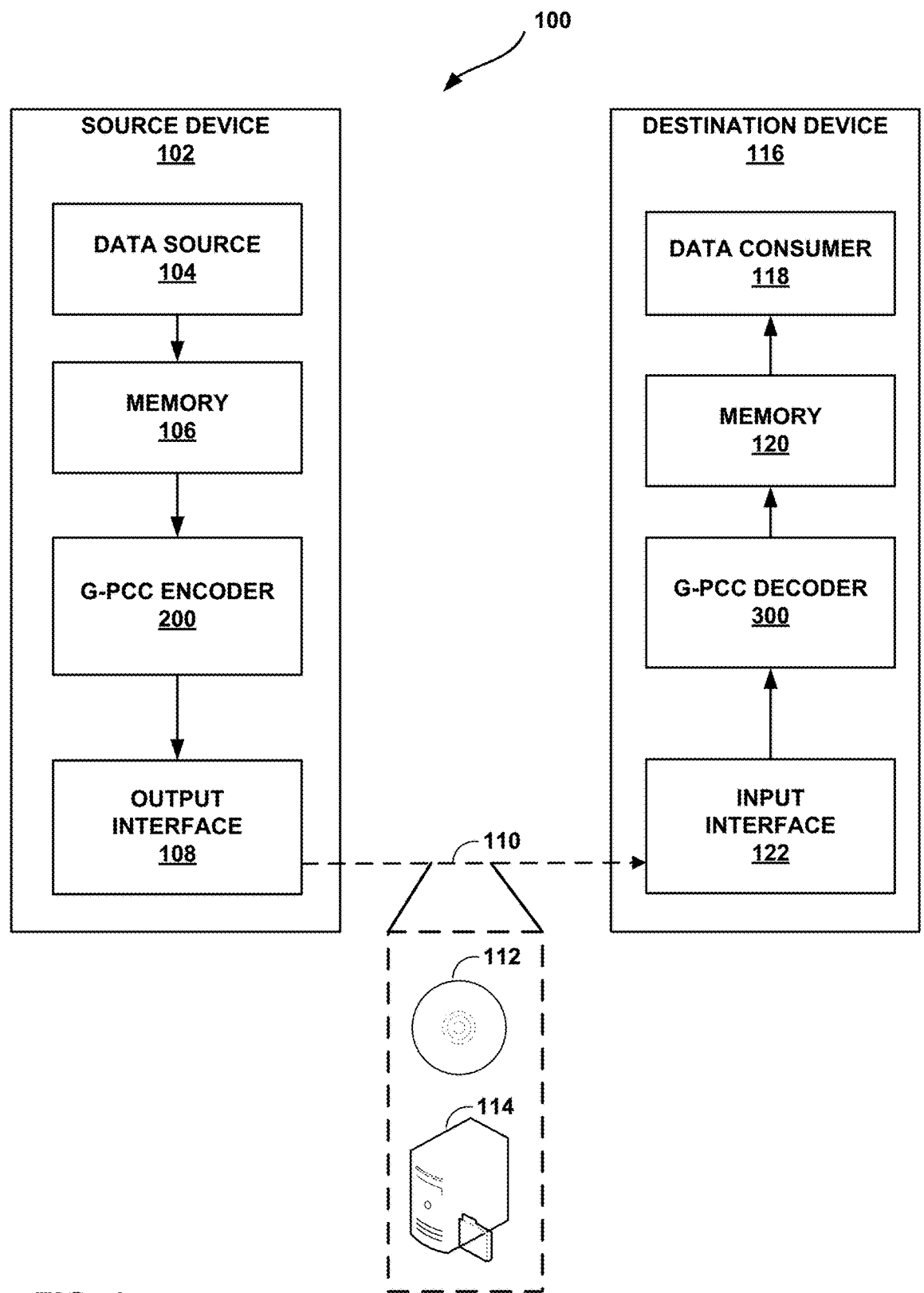
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to enabling and/or improving temporal scalability of G-PCC bitstreams.

Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to enabling and/or improving temporal scalability of G-PCC bitstreams.

Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like), such as a temporal identifier (ID), which is discussed further later in this disclosure. Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. In some examples, such syntax elements, such as a temporal ID may be included in syntax structures, such as slice headers or data unit headers. A slice header or data unit header may include syntax elements that are applicable to the slice or data unit associated with the header. G-PCC encoder 200 may signal values for syntax elements in the bitstream. G-PCC decoder 300 may parse the syntax elements to determine the signal values. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11), and more recently ISO/IEC 3DG (JTC 1/SC29/WG 7), are studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19328, Teleconference (previously Alpbach meeting) April 2020, and a description of the codec is available in G-PCC Codec Description v8, ISO/IEC JTC1/SC29/WG11 w19525, Teleconference, June 2020. Some recent changes to the G-PCC specification are available in G-PCC Future Enhancements, ISO/IEC JTC1/SC29/WG11 w19522, Teleconference, June 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud may be enclosed by a virtual bounding box. The position of the points in the bounding box may be represented by a certain precision. Therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on the number of points in each partition, or based on other considerations (e.g., a particular region may be coded as tiles). The slice regions may be further partitioned using splitting decisions similar to those in video codecs.

Figure 2:
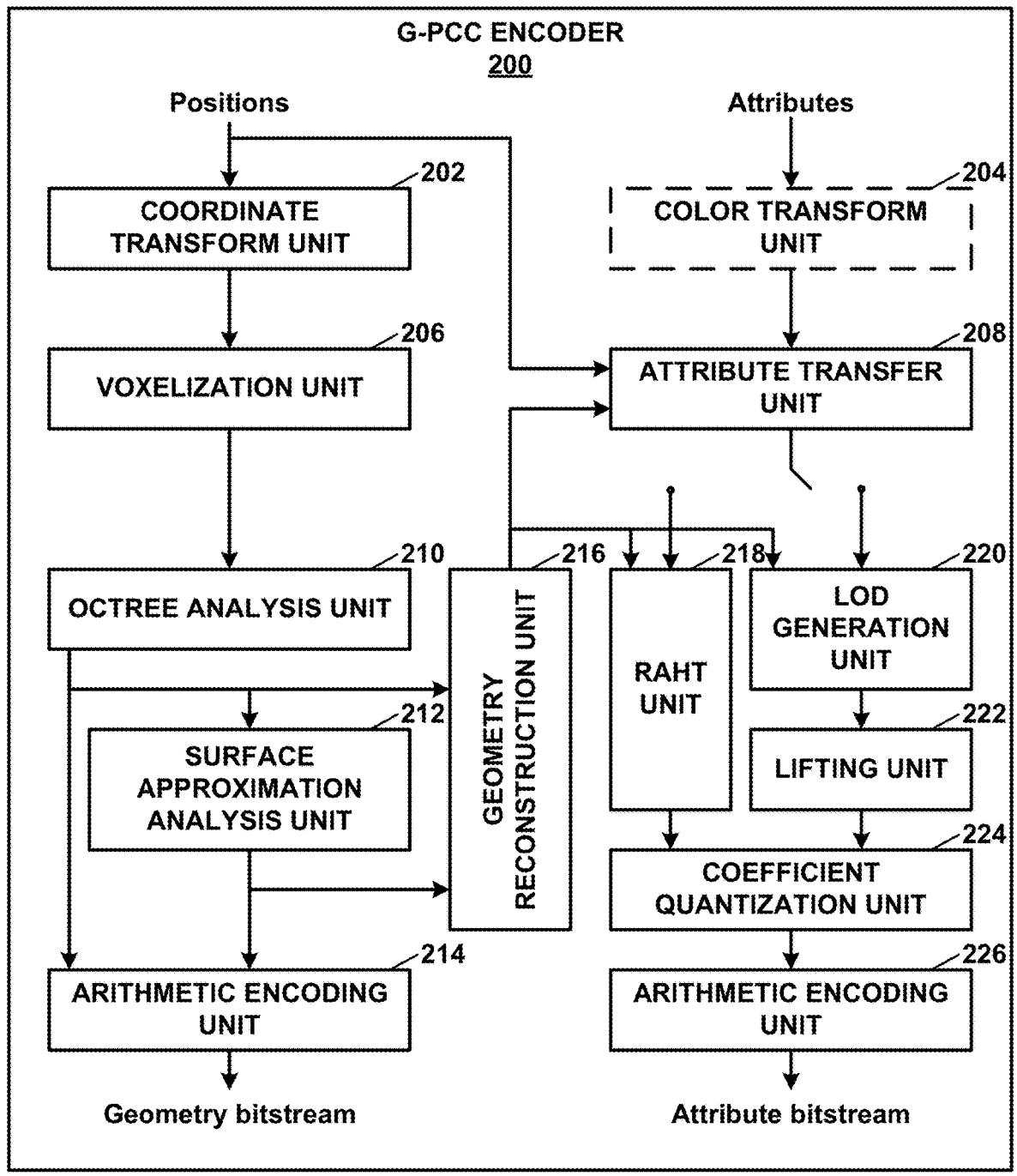
FIG. 2 is a block diagram illustrating an example Geometry Point Cloud Compression (G-PCC) encoder.
Figure 3:
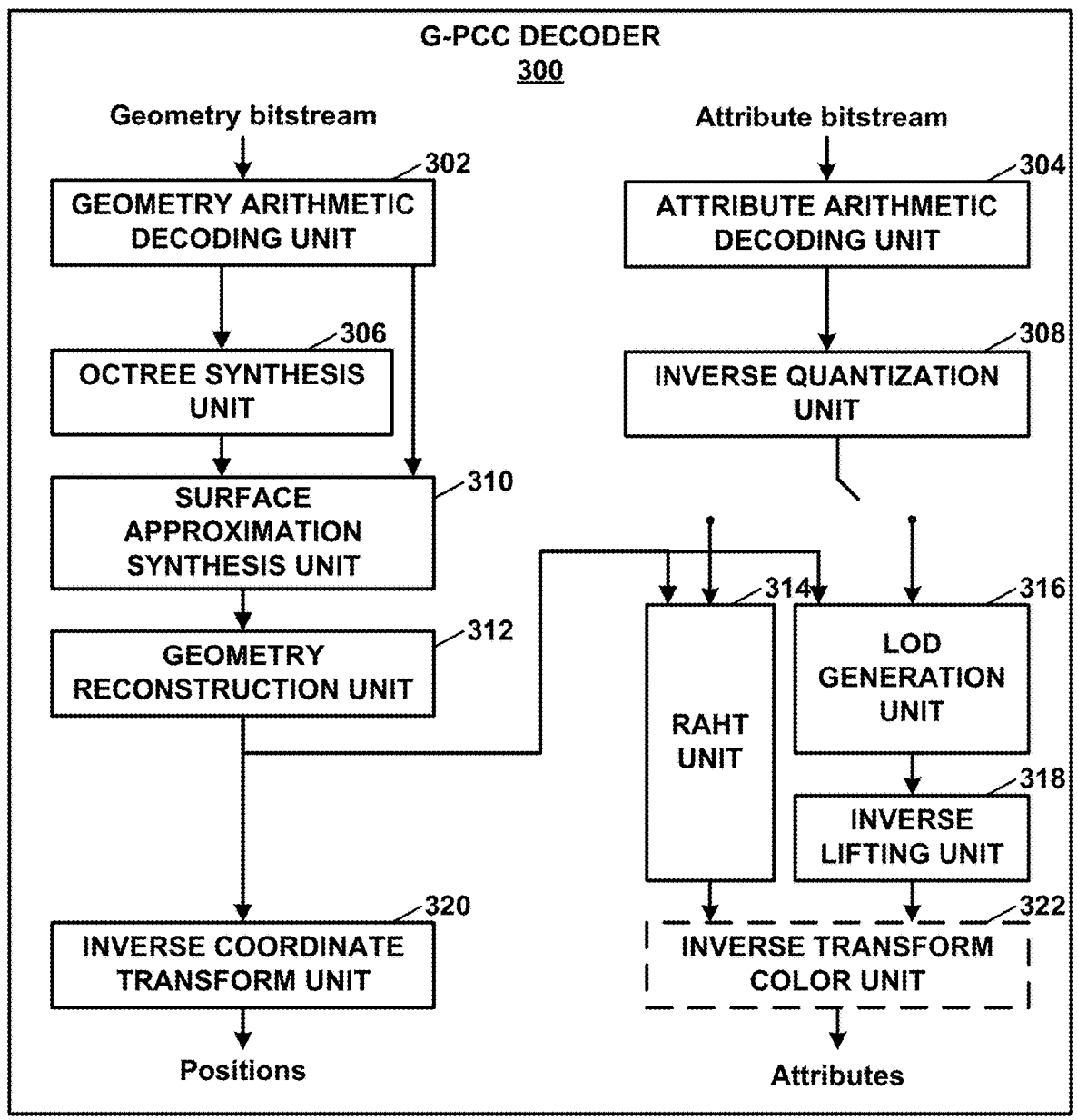
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, surface approximation analysis unit 212, RAHT unit 218, surface approximation synthesis unit 310, and RAHT unit 314 are options typically used for Category 1 data. LOD generation unit 220, lifting unit 222, LOD generation unit 316, and inverse lifting unit 318 are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may, in addition, approximate the voxels within each leaf with a surface model. The surface model used may be a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while the Predicting Transform is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on a distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements, such as a temporal ID, in the geometry bitstream. Similarly, attribute arithmetic decoding unit 304 may apply arithmetic decoding to syntax elements, such as a temporal ID, in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

In several applications, point cloud data, or points in the point cloud data, are associated with some aspect of time. The aspect of time may correspond to the point of capture of the point, or may correspond to a presentation/display time for the point cloud. Typically, the aspect of time may not be an absolute time, but rather be relative to some reference time. This time component may be specified as a specific attribute associated with time, or it may be coded as a frame index. The Frame index may serve the purpose of specifying the relation between the associated time points. For example, when a point A has frame index 3 and another point B has frame index 4, assuming that frame index magnitude is proportional to the time, point B is associated with a later point of time than point A.

It should be noted that in addition, some point clouds may be stored/represented as separate frames. Unless there is explicit signaling of a frame index or a time associated for each point within a frame, for practical purposes, all the points in the frame may be associated with the same time instance.

G-PCC codec supports "fusing" multiple frames such that G-PCC encoder 200 or G-PCC decoder 300 may be more efficient in coding multiple frames. The frame index is added as an attribute in the case of fusing multiple frames to distinguish points from the different frames that were fused. In G-PCC, this is known as "fused-coding" of frames, or "combined-frame coding."

Temporal scalability may be a desirable property of G-PCC bitstreams. With temporal scalability, G-PCC encoder 200 may partition the bitstream or the point cloud frames into temporal layers. Receiving a different subset of temporal layers enables G-PCC decoder 300 to decode the point cloud data at different frame rates. Typically (although this is not necessary), if G-PCC encoder 200 splits the frames into N temporal layers, then frames belonging to temporal layer 1 will represent the point cloud in one frame rate (e.g., 30 frames per second), frames belonging to temporal layers 1 and 2 will represent the point cloud in a higher frame rate (e.g., 60 frames per second), frames belonging to temporal layers 1, 2 and 3 will represent the point cloud in an even higher frame rate (e.g., 120 frames per second) and so on. In some examples, the temporal layers may be referred to by other numbers (e.g., 0, 1, and 2) or by other monikers. It may be desirable to identify the various temporal layers of the point cloud frames. Without any such identifying information, it may not be possible to distinguish which data units, slices, or frames belong to which temporal layer.

The techniques of this disclosure may address one or more problems related to distinguishing which data units, slices, or frames belong to which temporal layer. The techniques of this disclosure may be applied independently or in any combination.

In one example, G-PCC encoder 200 may signal a value that specifies (or is used to derive) a temporal ID associated with a syntax structure. The use of temporal IDs may make it possible to determine a temporal layer to which the syntax structure belongs. For example, the syntax structure may be associated with a slice or a data unit, such as a slice header or a data unit header, and G-PCC encoder 200 may signal a value that specifies the temporal ID of the slice or data unit. In G-PCC, a slice may include a geometry data unit and zero or more associated attribute data units. As used herein, a geometry data unit may also be referred to as a geometry slice and an attribute data unit may also be referred to as an attribute slice. The temporal ID may be in a slice syntax structure (such as a slice header), a geometry data unit syntax structure (such as a geometry data unit header), and/or an attribute data unit syntax structure (such as an attribute data unit header).

For example, G-PCC encoder 200 may determine a value of a temporal ID of a syntax structure and encode the point cloud data to include the temporal ID in the syntax structure, for example a slice header or data unit header. For example, G-PCC decoder 300 may determine a value of a temporal ID of a syntax structure and decode the point cloud data based on the value of the temporal ID. For example, G-PCC decoder 300 may decode the point cloud data if the value of the temporal ID is indicative of a temporal layer to be decoded at a decoding frame rate that is being used by G-PCC decoder 300.

In some examples, G-PCC encoder 200 may only signal the value in some syntax structures (e.g., syntax structures associated with geometry slices or data units), and G-PCC decoder 300 may derive a corresponding value for other syntax structures (e.g., syntax structures associated with attribute slices or data units) from the associated syntax structures that contain the value. For example, G-PCC encoder 200 may signal the value with geometry slices or data units and not with attribute slices or data units. In G-PCC, a geometry slice or data unit includes data describing positions of a set of points in the slice, while an associated attribute slice or data unit includes data describing attributes of the same set of points. In the example where G-PCC encoder 200 signals the value with geometry slices or data units and not with attribute slices or data units, G-PCC decoder 300 may derive the value associated with an attribute slice or data unit to be equal to the value associated with the geometry slice or data unit corresponding to the attribute slice, whereas typically an attribute slice or data unit contains the attribute information of the points signaled in the corresponding geometry slice. For example, G-PCC encoder 200 may refrain from signaling a value of a temporal ID associated with an attribute data unit corresponding to the geometry data unit. For example, G-PCC decoder 300 may infer a value of a temporal ID associated with an attribute data unit that corresponds to the geometry data unit to be equal to the value of the temporal ID associated with the geometry data unit. Inferring that the temporal ID associated with an attribute data unit is the same as the temporal ID associated with a geometry data unit corresponding to the attribute data unit may reduce the size of the attribute bitstream as compared to examples in which the temporal ID associated with the attribute data is signaled in the attribute bitstream.

In some examples, G-PCC encoder 200 may only signal the temporal ID value in independent slices (or slice headers) and not signal the temporal ID value in dependent slices (or slice headers). A dependent slice may be a slice that may depend on an earlier slice in order to be decoded. For example, G-PCC decoder 300 may be unable to decode a dependent slice without first decoding a slice upon which the dependent slice is dependent. In some examples, the temporal ID of dependent slices may be explicitly signaled, or may be inferred by G-PCC decoder 300 from other syntax elements (e.g., entropy continuation flag). For example, G-PCC encoder 200 may explicitly signal a temporal ID for a dependent slice, in which case G-PCC decoder 300 may determine the value of the temporal ID for the dependent slice by parsing the temporal ID. In another example, G-PCC encoder 200 may refrain from signaling a temporal ID for a dependent slice, in which case G-PCC decoder 300 may infer the temporal ID based on another syntax element(s).

In some examples, a constraint may be specified and G-PCC encoder 200 may apply the constraint that the temporal ID of two or more slices that belong to a point cloud frame are the same. For example, this constraint may ensure that slices belonging to a same frame have the same temporal ID and are therefore all available for G-PCC decoder 300 to decode when decoding the frame. If this constraint were not to exist, for example, and if the temporal ID for a first slice of a frame had a temporal ID of t1 and a second slice of the frame had a temporal ID of t2 (where t1 is less than t2), the second slice may not be available to G-PCC decoder 300 at lower frame rates. This may result in a decoding error.

For example, G-PCC encoder 200 may determine a value of a first temporal ID of a first syntax structure associated with a first slice of a frame. G-PCC encoder 200 may encode the point cloud data to include the first temporal ID in the first syntax structure. G-PCC encoder 200 may also determine a second temporal ID associated with a second slice of the frame to be equal to the first temporal ID and encode a second syntax structure associated with the second slice to include the second temporal ID.

For example, G-PCC decoder 300 may determine a value of a first temporal ID of a first syntax structure associated with a first slice of a frame. G-PCC decoder 300 may decode the first slice of the frame based on the value of the first temporal ID. G-PCC decoder 300 may also determine a second temporal ID associated with a second slice of the frame to be equal to the first temporal ID and decode the second slice of the frame based on the second temporal ID.

In some examples, a constraint may be specified and G-PCC encoder 200 and G-PCC decoder 300 may apply the constraint that the reconstruction of any point in a slice with a temporal ID t1 does not depend on any slice that has temporal ID t2, where t1 is less than t2. This constraint may ensure that any slice upon which another slice is dependent is received and decoded by G-PCC decoder 300. If this constraint were not to exist, for example, a first slice had a temporal ID of t2 and a second slice had a temporal ID of t1 (where t1 is less than t2) and the second slice is dependent on the first slice, the first slice may not be available to G-PCC decoder 300 when decoding the second slice (e.g., this may happen if a bitstream is extracted that has all syntax structures with temporal ID less than t2). This may result in a decoding error.

For example, G-PCC encoder 200 may determine a value of a first temporal ID of a first syntax structure associated with an independent slice. G-PCC encoder 200 may encode the point cloud data to include the first temporal ID in the first syntax structure. G-PCC encoder 200 may also determine a second temporal ID associated with a dependent slice, the dependent slice being dependent on the independent slice. G-PCC encoder 200 may determine a second temporal ID associated with a dependent slice, the dependent slice being dependent on the independent slice and encode the point cloud data to include the second temporal ID in a second syntax structure for the dependent slice, wherein the second temporal ID is equal to or greater than the first temporal ID.

For example, G-PCC decoder 300 may determine a value of a first temporal ID of a first syntax structure associated with an independent slice. G-PCC decoder 300 may decode the independent slice based on the value of the first temporal ID. G-PCC decoder 300 may also determine a second temporal ID associated with a dependent slice, the dependent slice being dependent on the independent slice, and decode the dependent slice based on the independent slice and the second temporal ID, wherein the second temporal ID is equal to or greater than the first temporal ID.

In some examples, when combined-frame coding is used, a restriction may be added such that G-PCC encoder 200 and G-PCC decoder 300 may only combine frames that have the same temporal ID into one frame. In some examples, G-PCC encoder 200 and G-PCC decoder 300 may apply the temporal ID, of the frames that are combined, to the combined frame. In some examples, for each frame that is associated with a combined frame with temporal ID tC, a G-PCC decoder 300 application may infer that the frame has temporal ID tC.

In some examples, a temporal ID may also be associated (and in some cases signaled by G-PCC encoder 200) with parameter sets. For example, a condition may be added and G-PCC encoder 200 may apply the condition that a slice that has temporal ID t1 may not refer to a parameter set that has temporal ID t2, where t2>t1. In some examples, G-PCC decoder 300 may infer the temporal ID of a slice to be equal to the temporal ID of a parameter set associated with the slice. If more than one parameter set may be associated with the slice, the largest value of the temporal ID of the associated parameter sets may be applied to the slice.

In another example, a fixed number of bits or bytes may be reserved in the slice header of G-PCC streams so that a future version of G-PCC may use one or more of these bits to indicate useful information (e.g., a temporal ID). For example, G-PCC encoder 200 may reserve a fixed number of bits or bytes in the slice header of G-PCC streams for a future version of G-PCC to use to indicate useful information. In such a case, G-PCC encoder 200 may not encode the reserved bits or bytes or may encode the reserved bits or bytes in a predetermined manner, such as all 0s, all 1s, or a combination of 0s and 1s. G-PCC decoder 300 may not decode the reserved bits or bytes or may decode the reserved bits or bytes and ignore the decoded reserved bits or bytes.

In some examples, G-PCC encoder 200 may signal a flag to indicate the presence, or lack thereof, of temporal ID information in one or more slices. G-PCC decoder 300 may parse the flag to determine whether temporal ID information is present in one or more slices. When the flag indicates that the temporal ID is present, G-PCC encoder 200 may signal the temporal ID in one or more slices and G-PCC decoder 300 may parse the temporal ID in the one or more slices to determine the temporal ID. In some examples, G-PCC encoder 200 may signal a flag to indicate whether reserved bits are present in one or more slices and G-PCC decoder 300 may parse the flag to determine whether reserved bits are present in one or more slices.

The term slice or slices as used above represents a set of points that are coded together, and may also apply to other sets of points coded together such as a block, tile, frame, brick, data unit, etc. Additionally, the location of signaling of any syntax element may be different from the location indicated, as any locations indicated herein are provided as examples.

The following example shows how G-PCC encoder 200 signals temporal ID information in the geometry slice header and attribute slice header. A geometry slice header may include syntax elements applicable to the geometry slice and the attribute slice head may include syntax elements applicable to the attribute slice.

The signaling techniques of this disclosure in the geometry data unit are shown below between <ADD> and </ADD> in the following syntax structure:

| | Descriptor |
|---|---|
| geometry_data_unit_header( ) { | |
|   gsh_geometry_parameter_set_id | ue(v) |
|   <ADD> gsh_temporal_id </ADD> | <ADD> u(3) </ADD> |
|   gsh_tile_id | ue(v) |
|   gsh_slice_id | ue(v) |
|   frame_idx | u(v) |
|   if( !sps_entropy_continuation_enabled_flag ) { | |
|     gsh_entropy_continuation_flag | u(1) |
|     if( gsh_entropy_continuation_flag ) | |
|       gsh_prev_slice_id | ue(v) |
|   } | |
|   if( gps_gsh_box_log2_scale_present_flag ) | |
|     gsh_box_log2_scale | ue(v) |
|   for( k = 0; k < 3; k++ ) | |
|     gsh_box_origin_xyz[ k ] | ue(v) |

-continued

```
                                                        Descriptor
    if( geom_octree_flag ) {
        geom_tree_depth_minus1                          ue(v)
        if( geom_tree_coded_axis_list_present_flag )
            for( lvl = 0; lvl <= geom_tree_depth_minus1; lvl++ )
                for( k = 0; k < 3; k++ )
                    geom_tree_coded_axis_flag[ lvl ][ k ]   u(1)
        gsh_entropy_stream_cnt_minus1                   ue(v)
        if( gsh_entropy_stream_cnt_minus1 ) {
            gsh_entropy_stream_len_bits                 u(6)
            for( i = 0; i < gsh_entropy_stream_cnt_minus1; i++)
                gsh_entropy_stream_len[ i ]             u(v)
        }
    }
    if( geom_scaling_enabled_flag ) {
        geom_slice_qp_offset                            se(v)
        geom_octree_qp_offsets_depth                    ue(v)
    }
    if( log2_trisoup_node_size ) {
        trisoup_sampling_value_minus1                   ue(v)
        num_unique_segments_minus1                      ue(v)
    }
    byte_alignment( )
}
```

<ADD> gsh_temporal_id specifies the temporal ID of the data unit. The value of gsh_temporal_id shall be in the range of 0 to MaxTemporand, inclusive. </ADD>MaxTemporand may be a value equal to the highest temporal ID permitted.

The value of MaxTemporand may be specified by a profile/level limit, or may be derived from a value signaled in the bitstream (e.g., the maximum temporal ID may be signaled in the sequence parameter set (SPS). In G-PCC, a profile or level may specify limits on the number of bits required to represent geometry and attribute information. The sequence parameter set may include syntax elements applicable to a sequence of frames.

In some examples, the coding of gsh_temporal_id may be variable length (e.g., ue(v)) or based on the value of Max-TemporalId.

In some examples, a temporal ID may also be signaled in the attribute slice header as a syntax element ash_temporal_id.

In some examples, the following constraint may apply: it is a requirement of bitstream conformance that the temporal ID of all slices belonging to a first point cloud frame shall be the same. However, another point cloud frame may have slices that have temporal IDs different from the first point cloud frame.

Figure 4:
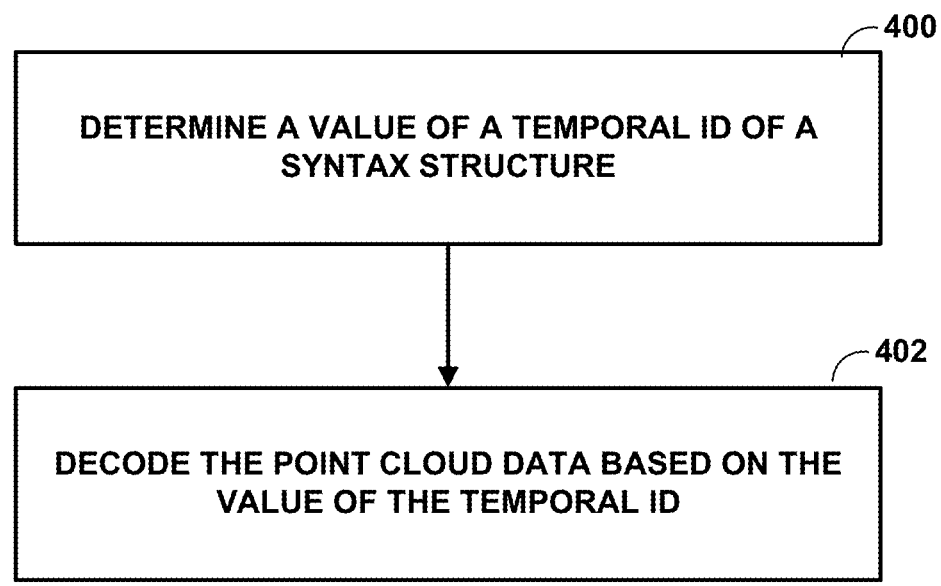
FIG. 4 is a flow diagram illustrating example G-PCC decoding techniques using a temporal identifier according to the techniques of this disclosure.

FIG. 4 is a flow diagram illustrating example G-PCC decoding techniques using a temporal identifier according to the techniques of this disclosure. G-PCC decoder 300 may determine a value of a temporal ID of a syntax structure (400). For example, G-PCC decoder 300 may parse a temporal ID syntax element in a syntax structure, such as a slice header or data unit header, to determine the value of the temporal ID of the syntax structure. G-PCC decoder 300 may decode the point cloud data based on the value of the temporal ID (402). For example, G-PCC decoder 300 may determine that the value of the temporal ID indicates that a slice or data unit associated with the temporal ID is to be decoded by G-PCC decoder 300 at a frame rate of the decoding and G-PCC decoder 300 may decode the slice or data unit. The temporal ID of the syntax structure may identify a temporal layer to which point cloud data associated with the syntax structure belongs.

In some examples, the syntax structure is associated with a slice or a data unit. In some examples, the syntax structure is associated with a geometry data unit. For example, the syntax structure may be a geometry data unit header. In some examples, G-PCC decoder 300 may infer a value of a temporal ID associated with an attribute data unit that corresponds to the geometry data unit to be equal to the value of the temporal ID associated with the geometry data unit, wherein decoding the point cloud data based on the value of the temporal ID comprises decoding the geometry data unit and decoding the attribute data unit. In such examples, the G-PCC decoder 300 may decode a slice belonging to the temporal layer indicated by the temporal ID without G-PCC encoder 200 having to signal the temporal ID in a syntax structure associated with the attribute data unit (e.g., an attribute data unit header). In some examples, G-PCC decoder 300 may determine a value of a flag indicative of whether the temporal ID is in the syntax structure.

In some examples, the temporal ID is a first temporal ID and the syntax structure is associated with a first slice of a frame. In such examples, G-PCC decoder 300 may determine a second temporal ID associated with a second slice of the frame to be equal to the first temporal ID and decode the frame based on the first temporal ID.

In some examples, the syntax structure is a first syntax structure associated with an independent slice and the temporal ID is a first temporal ID. In such examples, G-PCC decoder 300 may determine a second temporal ID associated with a dependent slice, the dependent slice being dependent on the independent slice and decode the dependent slice based on the independent slice and the second temporal ID, wherein the second temporal ID is equal to or greater than the first temporal ID.

In some examples, the point cloud data includes a plurality of frames of point cloud data, a first frame of point cloud data of the plurality of frames of point cloud data includes a plurality of slices, and each slice of the plurality of slices is associated with a same temporal ID.

In some examples, the point cloud data includes a first frame of point cloud data and a second frame of point cloud data, wherein the first frame of point cloud data includes a first slice associated with a first temporal ID t1 and the second frame of point cloud data includes a second slice associated with a second temporal ID t2, where t2>t1. In such examples, G-PCC decoder 300 may decode the first slice without depending on the second slice.

Figure 5:
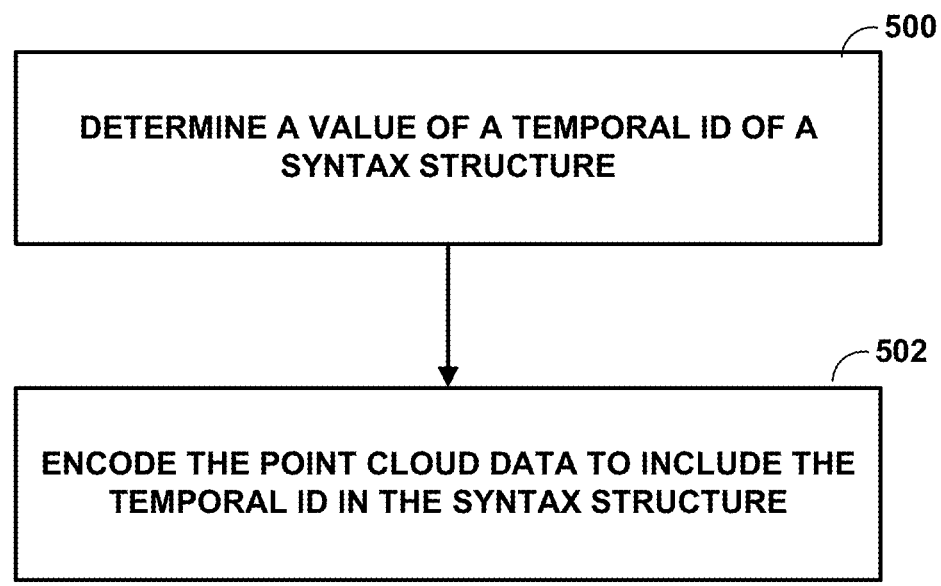
FIG. 5 is a flow diagram illustrating example G-PCC encoding techniques using a temporal identifier according to the techniques of this disclosure.

FIG. 5 is a flow diagram illustrating example G-PCC encoding techniques using a temporal identifier according to the techniques of this disclosure. G-PCC encoder 200 may determine value of a temporal ID of a syntax structure (500). For example, G-PCC encoder 200 may determine which temporal layer a slice or data unit should belong to such that the slice or data unit would be decoded by G-PCC decoder 300 at a given frame rate associated with the temporal layer and may determine the value of the temporal ID to be indicative of the temporal layer. G-PCC encoder 200 may encode the point cloud data to include the temporal ID in the syntax structure (502). For example, G-PCC encoder 200 may encode a slice header for the slice or data unit header for the data unit to include the value of temporal ID. The temporal ID of the syntax structure may identify a temporal layer to which point cloud data associated with the syntax structure belongs.

In some examples, the syntax structure is associated with a slice or a data unit. In some examples, the syntax structure is associated with a geometry data unit. In some examples, G-PCC encoder 200 may refrain from signaling a value of a temporal ID associated with an attribute data unit that corresponds to the geometry data unit. In some examples, G-PCC encoder 200 may signal a flag whose value is indicative of the temporal ID being in the syntax structure.

In some examples, the temporal ID is a first temporal ID and the syntax structure is a first syntax structure associated with a first slice of a frame. In such examples, G-PCC encoder 200 may determine a second temporal ID associated with a second slice of the frame to be equal to the first temporal ID and encode a second syntax structure associated with the second slice to include the second temporal ID.

In some examples, the syntax structure is a first syntax structure associated with an independent slice and the temporal ID is a first temporal ID. In such examples, G-PCC encoder 200 may determine a second temporal ID associated with a dependent slice, the dependent slice being dependent on the independent slice and encode the point cloud data to include the second temporal ID in a second syntax structure for the dependent slice, wherein the second temporal ID is equal to or greater than the first temporal ID.

In some examples, the point cloud data includes a plurality of frames of point cloud data, a first frame of point cloud data of the plurality of frames of point cloud data includes a plurality of slices, and each slice of the plurality of slices is associated with a same temporal ID.

In some examples, the point cloud data includes a first frame of point cloud data and a second frame of point cloud data, wherein the first frame of point cloud data includes a first slice associated with a first temporal ID t1 and the second frame of point cloud data includes a second slice associated with a second temporal ID t2, where t2>t1. In such examples, G-PCC encoder 200 may encode the first slice such that a decoder (e.g., G-PCC decoder 300) decodes the first slice without depending on the second slice.

Without temporal IDs in syntax structures of G-PCC bitstreams, a G-PCC decoder would not be able to correctly identify which frames, slices, or data units belong to which temporal layer and therefore, would not be able to correctly decode the G-PCC bitstream at different frame rates; alternately, it would have to decode all the frames in the bitstream and then determine which frames are to be presented at a lower frame rate—decoding all frames is computationally expensive and demands additional bandwidth. Without temporal IDs in syntax structures of G-PCC bitstreams, an intermediate network device that sends a bitstream to a G-PCC decoder would not be able to correctly identify which frames, slices, or data units belong to which temporal layer and therefore, would have to either send all the frames to the G-PCC decoder (which may require a relatively high bitrate) or send the frames that the intermediate network device determines to be sufficient for a particular frame rate (which may not result in good quality of the reconstructed point cloud). By adding temporal IDs to syntax structures of G-PCC bitstreams, G-PCC decoder 300 may decode different temporal layers in the G-PCC bitstreams at a variety of different frame rates. Thus, the techniques of this disclosure support desired flexible frame rates for G-PCC decoders. By adding temporal IDs to syntax structures of G-PCC bitstreams, an intermediate network device may choose slices/data units belonging to the desired temporal layers in the G-PCC bitstreams for a particular frame rate, and only send those slices/data units to G-PCC decoder 300. This use of temporal IDs saves bandwidth as all the slices/data units need not be sent to G-PCC decoder 300.

Examples in the various aspects of this disclosure may be used individually or in any combination.

This disclosure includes the following non-limiting clauses.

Clause 1A. A method of processing point cloud data, the method comprising: determining a value indicative of a temporal identifier associated with a syntax structure; and processing the point cloud data based on the value.

Clause 2A. The method of clause 1A, wherein the syntax structure comprises a slice or a data unit and the value comprises the temporal identifier.

Clause 3A. The method of clause 1A or clause 2A, further comprising: based on the syntax structure being a geometry slice, signaling or parsing the value.

Clause 4A. The method of clause 3, further comprising determining whether the syntax structure is a geometry slice.

Clause 5A. The method of clause 1A or clause 2A, further comprising: based on the syntax structure being an attribute slice, not signaling or inferring the value.

Clause 6A. The method of clause 5A, further comprising determining whether the syntax structure is an attribute slice.

Clause 7A. The method of clause 5A or clause 6A, wherein inferring the value comprises inferring the value to be equal to a value associated with a geometry slice corresponding to the attribute slice.

Clause 8A. The method of clause 2A, further comprising: based on the slice being independent, signaling or parsing the value.

Clause 9A. The method of clause 8A, further comprising determining whether the slice is independent.

Clause 10A. The method of clause 2A, further comprising: based on the slice being dependent, not signaling or inferring the value from at least one other syntax element.

Clause 11A. The method of clause 10A, further comprising determining whether the slice is dependent.

Clause 12A. A method of processing point cloud data, the method comprising: determining whether a frame of the point cloud data comprises two or more slices; based on the frame comprising two or more slices, determining a temporal ID for the two or more slices to be a same temporal ID; and processing the frame based on the temporal ID.

Clause 13A. A method of processing point cloud data, the method comprising: determining whether reconstruction of any point in a slice with a temporal identifier t1 would depend on any slice with a temporal identifier t2, where t1 is less than t2; and based on any point in the slice with the temporal identifier t1 depending on any slice with the temporal identifier t2, refraining from processing the slice with the temporal identifier t1 to depend on any slice with the temporal identifier t2.

Clause 14A. A method of processing point cloud data, the method comprising: determining whether two frames have a same temporal ID; based on the two frames not having the same temporal ID, refraining from combining the two frames into one frame; and processing the two frames without combining the two frames.

Clause 15A. The method of clause 14, wherein the two frames are a first two frames, further comprising: determining whether a second two frames have a same temporal ID; based on the second two frames having the same temporal ID, combining the second two frames into one frame; applying the same temporal ID to the one frame; and processing the one frame.

Clause 16A. The method of clause 15A, further comprising: inferring the same temporal ID of the one frame to be the temporal ID of each frame associated with the one frame.

Clause 17A. A method of processing point cloud data, the method comprising: determining a value indicative of a temporal ID associated with a parameter set; and processing the point cloud data based on the value.

Clause 18A. The method of clause 17A, further comprising: determining that a slice has a temporal ID of t1; determining that the parameter set has a temporal ID of t2, where t2>t1; and based on t2>t1, refraining from processing the slice to refer to the parameter set.

Clause 19A. The method of clause 17A, wherein the parameter set is associated with a slice, further comprising: inferring a temporal ID associated with the slice to be equal to the temporal ID associated with the parameter set.

Clause 20A. The method of clause 17A, wherein the parameter set is a first parameter set and wherein the first parameter set and a second parameter set are associated with a slice, further comprising: determining a largest value of the temporal ID associated with the first parameter set and a temporal ID associated with the second parameter set; and applying the largest value to the slice.

Clause 21A. A method of processing point cloud data, the method comprising: determining whether temporal ID information is present in one or more slices of the point cloud data; based on the temporal ID information being present in the one or more slices, signaling a flag indicative of the temporal ID information being present in the one or more slices; and processing the one or more slices.

Clause 22A. The method of clause 21A, further comprising: determining whether reserved bits are present in the one or more slices; and based on reserved bits being present in the one or more slices, signaling a flag indicative of reserved bits being present in the one or more slices.

Clause 23A. The method of any of clauses 1A-22A, further comprising generating the point cloud.

Clause 24A. A device for processing a point cloud, the device comprising one or more means for performing the method of any of clauses 1A-22A.

Clause 25A. The device of clause 24A, wherein the one or more means comprise one or more processors implemented in circuitry.

Clause 26A. The device of clause 24A or clause 25A, further comprising a memory to store the data representing the point cloud.

Clause 27A. The device of any of clauses 24A-26A, wherein the device comprises a decoder.

Clause 28A. The device of any of clauses 24A-26A, wherein the device comprises an encoder.

Clause 29A. The device of any of clauses 24A-28A, further comprising a device to generate the point cloud.

Clause 30A. The device of any of clauses 20A-29A, further comprising a display to present imagery based on the point cloud.

Clause 31A. A computer-readable storage medium having stored thereon instructions that, when executed, cause one or more processors to perform the method of any of clauses 1A-23A.

Clause 1B. A method of decoding point cloud data, the method comprising: determining a value of a temporal identifier (ID) of a syntax structure; and decoding the point cloud data based on the value of the temporal ID, wherein the temporal ID of the syntax structure identifies a temporal layer to which point cloud data associated with the syntax structure belongs.

Clause 2B. The method of clause 1B, wherein the syntax structure is associated with a slice or a data unit.

Clause 3B. The method of clause 2B, wherein the syntax structure is associated with a geometry data unit.

Clause 4B. The method of clause 3B, further comprising: inferring a value of a temporal ID associated with an attribute data unit that corresponds to the geometry data unit to be equal to the value of the temporal ID associated with the geometry data unit, wherein decoding the point cloud data based on the value of the temporal ID comprises decoding the geometry data unit and decoding the attribute data unit.

Clause 5B. The method of any of clauses 1B-4B, further comprising: determining a value of a flag indicative of whether the temporal ID is in the syntax structure.

Clause 6B. The method of any of clauses 1B-5B, wherein the temporal ID is a first temporal ID and the syntax structure is associated with a first slice of a frame, the method further comprising determining a second temporal ID associated with a second slice of the frame to be equal to the first temporal ID; and decoding the second slice of the frame based on the second temporal ID.

Clause 7B. The method of any of clauses 1B-5B, wherein the syntax structure is a first syntax structure associated with an independent slice and the temporal ID is a first temporal ID, the method further comprising: determining a second temporal ID associated with a dependent slice, the dependent slice being dependent on the independent slice; and decoding the dependent slice based on the independent slice and the second temporal ID, wherein the second temporal ID is equal to or greater than the first temporal ID.

Clause 8B. The method of any of clauses 1B-7B, wherein the point cloud data comprises a plurality of frames of point cloud data, wherein a first frame of point cloud data of the plurality of frames of point cloud data comprises a plurality of slices, and wherein each slice of the plurality of slices is associated with a same temporal ID.

Clause 9B. The method of any of clauses 1B-5B, wherein the point cloud data comprises a first frame of point cloud data and a second frame of point cloud data, wherein the first frame of point cloud data comprises a first slice associated with a first temporal ID t1 and the second frame of point cloud data comprises a second slice associated with a second temporal ID t2, where t2>t1, further comprising: decoding the first slice without depending on the second slice.

Clause 10B. A method of encoding point cloud data, the method comprising: determining a value of a temporal identifier (ID) of a syntax structure; and encoding the point cloud data to include the temporal ID in the syntax structure, wherein the temporal ID of the syntax structure identifies a temporal layer to which point cloud data associated with the syntax structure belongs.

Clause 11B. The method of clause 10B, wherein the syntax structure is associated with a slice or a data unit.

Clause 12B. The method of clause 11B, wherein the syntax structure is associated with a geometry data unit.

Clause 13B. The method of clause 12B, further comprising: refraining from signaling a value of a temporal ID associated with an attribute data unit that corresponds to the geometry data unit.

Clause 14B. The method of any of clauses 10B-13B, further comprising: signaling a flag whose value is indicative of the temporal ID being in the syntax structure.

Clause 15B. The method of any of clauses 10B-14B, wherein the temporal ID is a first temporal ID and the syntax structure is a first syntax structure associated with a first slice of a frame, the method further comprising determining a second temporal ID associated with a second slice of the frame to be equal to the first temporal ID; and encoding a second syntax structure associated with the second slice to include the second temporal ID.

Clause 16B. The method of any of clauses 10B-15B, wherein the syntax structure is a first syntax structure associated with an independent slice and the temporal ID is a first temporal ID, the method further comprising: determining a second temporal ID associated with a dependent slice, the dependent slice being dependent on the independent slice; and encoding the point cloud data to include the second temporal ID in a second syntax structure for the dependent slice, wherein the second temporal ID is equal to or greater than the first temporal ID.

Clause 17B. The method of any of clauses 10B-16B, wherein the point cloud data comprises a plurality of frames of point cloud data, wherein a first frame of point cloud data of the plurality of frames of point cloud data comprises a plurality of slices, and wherein each slice of the plurality of slices is associated with a same temporal ID.

Clause 18B. The method of any of clauses 10B-14B, wherein the point cloud data comprises a first frame of point cloud data and a second frame of point cloud data, wherein the first frame of point cloud data comprises a first slice associated with a first temporal ID t1 and the second frame of point cloud data comprises a second slice associated with a second temporal ID t2, where t2>t1, further comprising: encoding the first slice such that a decoder decodes the first slice without depending on the second slice.

Clause 19B. A device for decoding point cloud data, the device comprising: memory configured to store the point cloud data; and one or more processors implemented in circuitry and communicatively coupled to the memory, the one or more processors being configured to: determine a value of a temporal identifier (ID) of a syntax structure; and decode the point cloud data based on the value of the temporal ID, wherein the temporal ID of the syntax structure identifies a temporal layer to which point cloud data associated with the syntax structure belongs.

Clause 20B. The device of clause 19B, wherein the syntax structure is associated with a slice or a data unit.

Clause 21B. The device of clause 20B, wherein the syntax structure is associated with a geometry data unit.

Clause 22B. The device of clause 21B, wherein the one or more processors are further configured to: infer a value of a temporal ID associated with an attribute data unit that corresponds to the geometry data unit to be equal to the value of the temporal ID associated with the geometry data unit, wherein as part of decoding the point cloud data based on the value of the temporal ID, the one or more processors are configured to decode the geometry data unit and decode the attribute data unit.

Clause 23B. The device of any of clauses 19B-22B, wherein the one or more processors are further configured to: determine a value of a flag indicative of whether the temporal ID is in the syntax structure.

Clause 24B. The device of any of clauses 19B-23B, wherein the temporal ID is a first temporal ID and the syntax structure is associated with a first slice of a frame, and wherein the one or more processors are further configured to: determine a second temporal ID associated with a second slice of the frame to be equal to the first temporal ID; and decode the second slice of the frame based on the second temporal ID.

Clause 25B. The device of any of clauses 19B-23B, wherein the syntax structure is a first syntax structure associated with an independent slice and the temporal ID is a first temporal ID, and wherein the one or more processors are further configured to: determine a second temporal ID associated with a dependent slice, the dependent slice being dependent on the independent slice; and decode the dependent slice based on the independent slice and the second temporal ID, wherein the second temporal ID is equal to or greater than the first temporal ID.

Clause 26B. The device of any of clauses 19B-25B, wherein the point cloud data comprises a plurality of frames of point cloud data, wherein a first frame of point cloud data of the plurality of frames of point cloud data comprises a plurality of slices, and wherein each slice of the plurality of slices is associated with a same temporal ID.

Clause 27B. The device of any of clauses 19B-23B, wherein the point cloud data comprises a first frame of point cloud data and a second frame of point cloud data, wherein the first frame of point cloud data comprises a first slice associated with a first temporal ID t1 and the second frame of point cloud data comprises a second slice associated with a second temporal ID t2, where t2>t1, and wherein the one or more processors are further configured to: decode the first slice without depending on the second slice.

Clause 28B. The device of any of clauses 19B-27B, further comprising a display configured to display the point cloud data.

Clause 29B. A device for encoding point cloud data, the device comprising: memory configured to store the point cloud data; and one or more processors implemented in circuitry and communicatively coupled to the memory, the one or more processors being configured to: determine a value of a temporal identifier (ID) of a syntax structure; and encode the point cloud data to include the temporal ID in the syntax structure, wherein the temporal ID of the syntax structure identifies a temporal layer to which point cloud data associated with the syntax structure belongs.

Clause 30B. The device of clause 29B, wherein the syntax structure is associated with a slice or a data unit.

Clause 31B. The device of clause 30B, wherein the syntax structure is associated with a geometry data unit.

Clause 32B. The device of clause 29B, wherein the one or more processors are further configured to: refrain from signaling a value of a temporal ID associated with an attribute data unit that corresponds to the geometry data unit.

Clause 33B. The device of clause 29B-32B, wherein the one or more processors are further configured to: signal a flag whose value is indicative of the temporal ID being in the syntax structure.

Clause 34B. The device of any of clauses 29B-33B, wherein the temporal ID is a first temporal ID and the syntax structure is a first syntax structure associated with a first slice of a frame, and wherein the one or more processors are further configured to: determine a second temporal ID associated with a second slice of the frame to be equal to the first temporal ID; and encode a second syntax structure associated with the second slice to include the second temporal ID.

Clause 35B. The device of any of clauses 29B-33B, wherein the syntax structure is a first syntax structure associated with an independent slice and the temporal ID is a first temporal ID, and wherein the one or more processors are further configured to: determine a second temporal ID associated with a dependent slice, the dependent slice being dependent on the independent slice; and encode the point cloud data to include the second temporal ID in a second syntax structure for the dependent slice, wherein the second temporal ID is equal to or greater than the first temporal ID.

Clause 36B. The device of any of clauses 29B-35B, wherein the point cloud data comprises a plurality of frames of point cloud data, wherein a first frame of point cloud data of the plurality of frames of point cloud data comprises a plurality of slices, and wherein each slice of the plurality of slices is associated with a same temporal ID.

Clause 37B. The device of any of clauses 29B-33B, wherein the point cloud data comprises a first frame of point cloud data and a second frame of point cloud data, wherein the first frame of point cloud data comprises a first slice associated with a first temporal ID t1 and the second frame of point cloud data comprises a second slice associated with a second temporal ID t2, where t2>t1, and wherein the one or more processors are further configured to: encode the first slice such that a decoder decodes the first slice without depending on the second slice.

Clause 38B. The device of any of clauses 29B-37B, wherein the device comprises a vehicle.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding point cloud data, the method comprising:
   determining a value of a temporal identifier (ID) of a syntax structure associated with a geometry data unit; wherein the temporal ID of the syntax structure identifies a temporal layer to which point cloud data associated with the syntax structure belongs; and
   inferring a value of a temporal ID associated with an attribute data unit that corresponds to the geometry data unit to be equal to the value of the temporal ID associated with the geometry data unit; and decoding the point cloud data based on the value of the temporal ID, wherein decoding the point cloud data based on the value of the temporal ID comprises decoding the geometry data unit and decoding the attribute data unit.

2. The method of claim 1, further comprising:

determining a value of a flag indicative of whether the temporal ID is in the syntax structure.

3. The method of claim 1, wherein the temporal ID is a first temporal ID and the syntax structure is associated with a first slice of a frame, the method further comprising:

determining a second temporal ID associated with a second slice of the frame to be equal to the first temporal ID; and decoding the second slice of the frame based on the second temporal ID.

4. The method of claim 1, wherein the syntax structure is a first syntax structure associated with an independent slice and the temporal ID is a first temporal ID, the method further comprising:

determining a second temporal ID associated with a dependent slice, the dependent slice being dependent on the independent slice; and decoding the dependent slice based on the independent slice and the second temporal ID, wherein the second temporal ID is equal to or greater than the first temporal ID.

5. The method of claim 1, wherein the point cloud data comprises a plurality of frames of point cloud data, wherein a first frame of point cloud data of the plurality of frames of point cloud data comprises a plurality of slices, and wherein each slice of the plurality of slices is associated with a same temporal ID.

6. The method of claim 1, wherein the point cloud data comprises a first frame of point cloud data and a second frame of point cloud data, wherein the first frame of point cloud data comprises a first slice associated with a first temporal ID t1 and the second frame of point cloud data comprises a second slice associated with a second temporal ID t2, where t2>t1, further comprising:

decoding the first slice without depending on the second slice.

7. A method of encoding point cloud data, the method comprising:

determining a value of a temporal identifier (ID) of a syntax structure associated with a geometry data unit, wherein the temporal ID of the syntax structure identifies a temporal layer to which point cloud data associated with the syntax structure belongs; and refraining from signaling a value of a temporal ID associated with an attribute data unit that corresponds to the geometry data unit; and encoding the point cloud data to include the temporal ID in the syntax structure.

8. The method of claim 7, further comprising:

signaling a flag whose value is indicative of the temporal ID being in the syntax structure.

9. The method of claim 7, wherein the temporal ID is a first temporal ID and the syntax structure is a first syntax structure associated with a first slice of a frame, further comprising:

determining a second temporal ID associated with a second slice of the frame to be equal to the first temporal ID; and encoding a second syntax structure associated with the second slice to include the second temporal ID.

10. The method of claim 7, wherein the syntax structure is a first syntax structure associated with an independent slice and the temporal ID is a first temporal ID, further comprising:

determining a second temporal ID associated with a dependent slice, the dependent slice being dependent on the independent slice; and encoding the point cloud data to include the second temporal ID in a second syntax structure for the dependent slice, wherein the second temporal ID is equal to or greater than the first temporal ID.

11. The method of claim 7, wherein the point cloud data comprises a plurality of frames of point cloud data, wherein a first frame of point cloud data of the plurality of frames of point cloud data comprises a plurality of slices, and wherein each slice of the plurality of slices is associated with a same temporal ID.

12. The method of claim 7, wherein the point cloud data comprises a first frame of point cloud data and a second frame of point cloud data, wherein the first frame of point cloud data comprises a first slice associated with a first temporal ID t1 and the second frame of point cloud data comprises a second slice associated with a second temporal ID t2, where t2>t1, further comprising:

encoding the first slice such that a decoder decodes the first slice without depending on the second slice.

13. A device for decoding point cloud data, the device comprising:

memory configured to store the point cloud data; and one or more processors implemented in circuitry and communicatively coupled to the memory, the one or more processors being configured to:

determine a value of a temporal identifier (ID) of a syntax structure associated with a geometry data unit, wherein the temporal ID of the syntax structure identifies a temporal layer to which point cloud data associated with the syntax structure belongs; and infer a value of a temporal ID associated with an attribute data unit that corresponds to the geometry data unit to be equal to the value of the temporal ID associated with the geometry data unit; and decode the point cloud data based on the value of the temporal ID, wherein as part of decoding the point cloud data based on the value of the temporal ID, the one or more processors are configured to decode the geometry data unit and decode the attribute data unit.

14. The device of claim 13, wherein the one or more processors are further configured to:

determine a value of a flag indicative of whether the temporal ID is in the syntax structure.

15. The device of claim 13, wherein the temporal ID is a first temporal ID and the syntax structure is associated with a first slice of a frame, and wherein the one or more processors are further configured to:

determine a second temporal ID associated with a second slice of the frame to be equal to the first temporal ID; and decode the second slice of the frame based on the second temporal ID.

16. The device of claim 13, wherein the syntax structure is a first syntax structure associated with an independent slice and the temporal ID is a first temporal ID, and wherein the one or more processors are further configured to:

determine a second temporal ID associated with a dependent slice, the dependent slice being dependent on the independent slice; and decode the dependent slice based on the independent slice and the second temporal ID, wherein the second temporal ID is equal to or greater than the first temporal ID.

17. The device of claim 13, wherein the point cloud data comprises a plurality of frames of point cloud data, wherein a first frame of point cloud data of the plurality of frames of point cloud data comprises a plurality of slices, and wherein each slice of the plurality of slices is associated with a same temporal ID.

18. The device of claim 13, wherein the point cloud data comprises a first frame of point cloud data and a second frame of point cloud data, wherein the first frame of point cloud data comprises a first slice associated with a first temporal ID t1 and the second frame of point cloud data comprises a second slice associated with a second temporal ID t2, where t2>t1, and wherein the one or more processors are further configured to:

decode the first slice without depending on the second slice.

19. The device of claim 13, further comprising a display configured to display the point cloud data.

20. A device for encoding point cloud data, the device comprising:

memory configured to store the point cloud data; and one or more processors implemented in circuitry and communicatively coupled to the memory, the one or more processors being configured to:

determine a value of a temporal identifier (ID) of a syntax structure associated with a geometry data unit, wherein the temporal ID of the syntax structure identifies a temporal layer to which point cloud data associated with the syntax structure belongs; and refrain from signaling a value of a temporal ID associated with an attribute data unit that corresponds to the geometry data unit; and encode the point cloud data to include the temporal ID in the syntax structure.

21. The device of claim 20, wherein the one or more processors are further configured to:

signal a flag whose value is indicative of the temporal ID being in the syntax structure.

22. The device of claim 20, wherein the temporal ID is a first temporal ID and the syntax structure is a first syntax structure associated with a first slice of a frame, and wherein the one or more processors are further configured to:

determine a second temporal ID associated with a second slice of the frame to be equal to the first temporal ID; and encode a second syntax structure associated with the second slice to include the second temporal ID.

23. The device of claim 20, wherein the syntax structure is a first syntax structure associated with an independent slice and the temporal ID is a first temporal ID, and wherein the one or more processors are further configured to:

determine a second temporal ID associated with a dependent slice, the dependent slice being dependent on the independent slice; and encode the point cloud data to include the second temporal ID in a second syntax structure for the dependent slice, wherein the second temporal ID is equal to or greater than the first temporal ID.

24. The device of claim 20, wherein the point cloud data comprises a plurality of frames of point cloud data, wherein a first frame of point cloud data of the plurality of frames of point cloud data comprises a plurality of slices, and wherein each slice of the plurality of slices is associated with a same temporal ID.

25. The device of claim 20, wherein the point cloud data comprises a first frame of point cloud data and a second frame of point cloud data, wherein the first frame of point cloud data comprises a first slice associated with a first temporal ID t1 and the second frame of point cloud data comprises a second slice associated with a second temporal ID t2, where t2>t1, and wherein the one or more processors are further configured to:

encode the first slice such that a decoder decodes the first slice without depending on the second slice.

26. The device of claim 20, wherein the device comprises a vehicle.

* * * * *